United States Patent
Casebeer et al.

(10) Patent No.: US 10,239,709 B2
(45) Date of Patent: Mar. 26, 2019

(54) VENEER FEEDER HEAD

(71) Applicant: Sweed Machinery, Inc., Gold Hill, OR (US)

(72) Inventors: Tyler W. Casebeer, White City, OR (US); Chris J. Salyer, Central Point, OR (US)

(73) Assignee: SWEED MACHINERY INC., Gold Hill, OR (US)

( * ) Notice: Subject to any disclaimer, the term of this patent is extended or adjusted under 35 U.S.C. 154(b) by 3 days.

(21) Appl. No.: 15/619,266

(22) Filed: Jun. 9, 2017

(65) Prior Publication Data

US 2018/0354731 A1    Dec. 13, 2018

(51) Int. Cl.
*B65G 59/04* (2006.01)

(52) U.S. Cl.
CPC .................... *B65G 59/04* (2013.01)

(58) Field of Classification Search
CPC ........ B65G 59/02; B65G 59/08; B65G 47/90; B65G 47/901; B65G 47/905; B65G 47/907; B65G 47/91; B65G 47/912; B65G 47/917; B65G 47/918; B65H 3/0816; B65H 3/0808; B65H 3/0833; B65H 3/0825; B65B 35/18
USPC ...................................................... 414/796.6
See application file for complete search history.

(56) References Cited

U.S. PATENT DOCUMENTS

| | | | | |
|---|---|---|---|---|
| 3,724,687 A | * | 4/1973 | Marschke | B65G 47/907 271/11 |
| 3,826,485 A | * | 7/1974 | Shindo | B65H 3/0816 271/106 |
| 4,781,091 A | * | 11/1988 | Nakaya | B26D 7/1836 198/441 |
| 5,083,763 A | * | 1/1992 | Hartta | B65H 3/0816 271/103 |
| 5,244,343 A | * | 9/1993 | Lockert | B65H 29/36 271/194 |
| 5,803,447 A | * | 9/1998 | Singer | B65H 3/0883 271/107 |
| 5,951,001 A | * | 9/1999 | Stradi | B65H 3/22 271/104 |
| 6,468,025 B1 | * | 10/2002 | Stumpf | B21D 43/24 271/18.1 |
| 6,886,827 B2 | * | 5/2005 | Dachtler | B65H 3/0816 271/106 |

FOREIGN PATENT DOCUMENTS

JP     60-252543    * 12/1985  ............... B65H 3/08

* cited by examiner

*Primary Examiner* — Lynn E Schwenning
(74) *Attorney, Agent, or Firm* — Renner, Otto, Boisselle & Sklar, LLP (57) ABSTRACT

A veneer feeder head used to peel a veneer sheet from a stack of veneer. A stationary head and an actuating head both contact the top veneer sheet and the actuating head moves into a peel state, where the one portion of the top veneer sheet is raised higher than another portion of the top veneer sheet. This peeling action separates the top veneer sheet from the next veneer sheet in the stack of veneer.

11 Claims, 6 Drawing Sheets

VENEER FEEDER HEAD

TECHNICAL FIELD

The present invention relates generally to a veneer feeding device, and more particularly to a veneer feeder head.

BACKGROUND

A veneer (also called a veneer sheet) is a thin layer of material, typically wood, but also potentially metal, polymer or ceramic. A layer of veneer may be used as a protective or ornamental facing, such as on the outside surface of a sheet of particle board. Or multiple layers of veneer may be bonded together, as in the formation of plywood.

A veneer feeder removes veneer sheets from a stack of veneer and feeds the veneer sheets into a dryer, where the moisture is removed from the veneer.

SUMMARY

It is important that the veneer feeder operates without error. Currently, veneer feeders use feeder heads (also called cups) to pull a top sheet of veneer off of a stack of veneer. The feeder heads often use negative pressure to lift the top veneer sheet off of the stack of veneer. Such transfer mechanisms cannot achieve error free transfer and are prone to misfeeding. Often cracks or pores in the top veneer sheet result in the top two veneer sheets being grabbed at the same time by the feeder head (instead of a single sheet). Also, certain substances (such as mold and/or sap) may adhere two or more veneer sheets together.

When two or more sheets are placed together into the dryer, the dryer efficiency decreases. This decrease in efficiency is due to the required increased time required to adequately dry two stacked veneer sheets compared to a single veneer sheet. The increased dryer time may also result in overdrying of single veneer sheets loaded into the dryer at the same time.

Provided is a veneer feeder head that uses at least two heads to peel a top veneer sheet off of a stack of veneer by lifting one portion of the veneer sheet higher than another portion of the veneer sheet.

According to one aspect, there is provided a veneer feeder head configured to peel a veneer sheet from a stack of veneer. The veneer feeder head includes an actuating head, a stationary head, and an actuator. The actuating head includes a gripping device having an engaged state and a disengaged state. In the engaged state the gripping device is configured to maintain a position of a portion of the veneer sheet relative to the actuating head, such that movement of the actuating head results in an accompanying movement of the portion of the veneer sheet. The stationary head is configured to contact a segment of the veneer sheet separate from the portion of the veneer sheet. The actuator is configured to cause the actuating head to move relative to the stationary head, such that the actuating head moves between a peel state and a pressing state. When the gripping device is in the engaged state and the actuating head is in a peel state, the portion of the veneer sheet is located in a different plane than the segment of the veneer sheet.

Alternatively or additionally, the actuating head is configured to pivot relative to the stationary head, such that when the actuating head is in a peel state a plane defined by the portion of the veneer sheet intersects a plane defined by the segment of the veneer sheet.

Alternatively or additionally, the actuating head is configured to move relative to the stationary head, such that when the actuating head is in a peel state a plane defined by the portion of the veneer sheet is different from and parallel to a plane defined by the segment of the veneer sheet.

Alternatively or additionally, the actuator is further configured to move the actuating head and the stationary head towards and away from the sheet of veneer. The gripping device is located on a contacting surface of the actuating head. The stationary head includes a touching surface. When the actuator moves the actuating head and the stationary head towards the veneer sheet causing the contacting surface and the touching surface to press against the veneer sheet, the actuating head is in the pressing state. In the pressing state, the contacting surface and the touching surface are located in a same plane defined by the veneer sheet. When the actuator moves the actuating head and the stationary head away from the veneer sheet, the actuating head enters the peel state. In the peel state, the contacting surface and the touching surface are located in different planes.

Alternatively or additionally, the stationary head includes a grabbing device having an engaged state and a disengaged state. In the engaged state the grabbing device is configured to maintain a position of the segment of the veneer sheet relative to the stationary head, such that movement of the stationary head results in an accompanying movement of the segment of the veneer sheet.

Alternatively or additionally, the gripping device maintains the position of the portion of the veneer sheet using at least one of negative pressure or a fastener.

Alternatively or additionally, the fastener comprises at least one nail.

Alternatively or additionally, in the disengaged state the gripping device and the portion of the veneer sheet are uncoupled, such that the position of the portion of the veneer sheet is independent from the position of the actuating head.

According to another aspect, a veneer feeding device is configured to remove a veneer sheet from a stack of veneer. The veneer feeding device includes a veneer feeder head and circuitry. The actuator of the veneer feeder head is further configured to move the actuating head and the stationary head towards and away from the stack of veneer. The circuitry configured to control movement of the actuating head and the stationary head by the actuator, such that the actuating head and the stationary head make contact with the veneer sheet. The circuitry is also configured to separate the veneer sheet from the stack of veneer by causing the gripping device to be in the engaged state and by controlling movement of the actuating head by the actuator, such that the actuating head moves from the pressing state to the peel state.

Alternatively or additionally, the veneer feeding device also includes a gross actuator configured to laterally move the veneer feeder head along a direction of travel between a home position and a feeding position. After separating the veneer sheet from the stack of veneer, the circuitry is further configured to maintain the gripping device in the engaged state and cause the actuator to raise the actuating head, the stationary head, and the veneer sheet. The circuitry is also configured to cause the gross actuator to move the actuating head, the stationary head, and the veneer sheet along the direction of travel to the feeding position. The circuitry is further configured to cause the gripping device to be in a disengaged state.

Alternatively or additionally, the veneer feeding device further includes a holding area configured to receive the stack of veneer. The veneer sheet is located at a top position of the stack of veneer. Along the direction of travel, the veneer sheet includes a front half including a front edge and a back half including a back edge. The veneer feeder head is positioned over the holding area in a location associated with either the front half or the back half of the veneer sheet when the stack of veneer is located in the holding area. When the veneer feeding head is positioned over the front half, the actuating head is positioned closer to the front edge than the stationary head. When the veneer feeding head is positioned over the back half, the actuating head is positioned closer to the back edge than the stationary head.

Alternatively or additionally, the veneer feeding device includes a holding area configured to receive the stack of veneer. The veneer sheet is located at a top position of the stack of veneer. Transverse to the direction of travel, the veneer sheet includes a left half including a left edge and a right half including a right edge. The veneer feeder head is positioned over the holding area in a location associated with either the left half or the right half of the veneer sheet when the stack of veneer is located in the holding area. When the veneer feeding head is positioned over the left half, the actuating head is positioned closer to the left edge than the stationary head. When the veneer feeding head is positioned over the right half, the actuating head is positioned closer to the right edge than the stationary head.

According to a further aspect, a veneer feeding device configured to remove a veneer sheet from a stack of veneer. The veneer feeding device includes a veneer feeder head, another veneer feeder head, and circuitry. The actuator of the veneer feeder head is further configured to move the actuating head of the veneer feeder head and the stationary head of the veneer feeder head towards and away from the stack of veneer. The actuator of the another veneer feeder head is further configured to move the actuating head of the another veneer feeder head and the stationary head of the another veneer feeder head towards and away from the stack of veneer. The circuitry is configured to control movement of the veneer feeder head and the another veneer feeder head by the actuator of the veneer feeder head and the actuator of the another veneer feeder head, such that the actuating head and the stationary head of the veneer feeding head make contact with the veneer sheet and the actuating head and the stationary head of the another veneer feeder head make contact with the veneer sheet. The circuitry is further configured to separate the veneer sheet from the stack of veneer by causing the gripping device of both the veneer feeder head and the another veneer feeder head to be in the engaged state. The circuitry is also configured controlling movement of the actuating head of the veneer feeder head by the actuator of the veneer feeder head, such that the actuating head of the veneer feeder head moves from the pressing state to the peel state. The circuitry is additionally configured to control movement of the actuating head of the another veneer feeder head by the actuator of the another veneer feeder head, such that the actuating head of the another veneer feeder head moves from the pressing state to the peel state.

Alternatively or additionally, further including a holding area configured to receive the stack of veneer. A gross actuator is configured to laterally move at least one of the veneer feeder head or the another veneer feeder head along a direction of travel between a home position and a feeding position. The veneer sheet is located at a top position of the stack of veneer. Along the direction of travel, the veneer sheet includes a front half including a front edge and a back half including a back edge. In the home position, the actuating head of the veneer feeder head is positioned over the holding area in a location associated with the front half and closer to the front edge of the veneer sheet than the stationary head of the veneer feeder head. In the home position, the actuating head of the another veneer feeder head is positioned over the holding area in a location associated with the back half and closer to the back edge of the veneer sheet than the stationary head of the another veneer feeder head.

Alternatively or additionally, further including a holding area configured to receive the stack of veneer. A gross actuator configured to laterally move at least one of the veneer feeder head or the another veneer feeder head along a direction of travel between a home position and a feeding position. The veneer sheet is located at a top position of the stack of veneer. Along a direction perpendicular to the direction of travel, the veneer sheet includes a left half including a left edge and a right half including a right edge. In the home position, the actuating head of the veneer feeder head is positioned over the holding area in a location associated with the left half and closer to the left edge of the veneer sheet than the stationary head of the veneer feeder head. In the home position, the actuating head of the another veneer feeder head is positioned over the holding area in a location associated with the right half and closer to the right edge of the veneer sheet than the stationary head of the another veneer feeder head.

According to an additional aspect, there is provided a veneer feeding device is configured to remove a veneer sheet from a stack of veneer. The veneer feeding device includes a veneer feeder head and circuitry. The veneer feeder head further includes an another actuating head including a holding device having an engaged state and a disengaged state, wherein in the engaged state the holding device is configured to maintain a position of a section of the veneer sheet relative to the another actuating head, such that movement of the another actuating head results in an accompanying movement of the section of the veneer sheet. The actuator is further configured to cause the another actuating head to move relative to the stationary head, such that the another actuating head moves between a peel state and a pressing state. When the holding device is in the engaged state and the another actuating head is in the peel state, the section of the veneer sheet is located in a different plane than the segment of the veneer sheet. The circuitry is configured to control movement of the actuating head, the stationary head, and the another actuating head by the actuator, such that the actuating head, the stationary head, and the another actuating head make contact with the veneer sheet. The circuitry is also configured to separate the veneer sheet from the stack of veneer by causing the gripping device and the holding device to be in the engaged state and by controlling movement of the actuating head and the another actuating head by the actuator, such that the actuating head and the another actuating head moves from the pressing state to the peel state.

Alternatively or additionally, further comprising a holding area configured to receive the stack of veneer. A gross actuator configured to laterally move at least one of the stationary head, the actuating head, or the another actuating head along a direction of travel between a home position and a feeding position. The veneer sheet is located at a top position of the stack of veneer. Along the direction of travel, the veneer sheet includes a front half including a front edge and a back half including a back edge. In the home position, the actuating head is positioned over the holding area in a location associated with the front half and closer to the front edge of the veneer sheet than the stationary head. In the home position, the another actuating head is positioned over the holding area in a location associated with the back half and closer to the back edge of the veneer sheet than the stationary head.

Alternatively or additionally, further including a holding area configured to receive a stack of veneer. A gross actuator configured to laterally move at least one of the stationary head, the actuating head, or the another actuating head along a direction of travel between a home position and a feeding position. The veneer sheet is located at a top position of the stack of veneer. Along a direction perpendicular to the direction of travel, the veneer sheet includes a left half including a left edge and a right half including a right edge. In the home position, the actuating head is positioned over the holding area in a location associated with the left half and closer to the left edge of the veneer sheet than the stationary head. In the home position, the another actuating head is positioned over the holding area in a location associated with the right half and closer to the right edge of the veneer sheet than the stationary head.

According to still another aspect, a method for differential pickup of a single veneer sheet from a top of a stack of veneer sheets using a veneer feeding head including an actuating head and a stationary head. The method includes moving the actuating head and the stationary head into contact with the single veneer sheet, such that the actuating head contacts a portion of the veneer sheet and the stationary head contacts a segment of the veneer sheet separate from the portion of the veneer sheet. The method also includes engaging a gripping device of the actuating head such that gripping device maintains a position of the portion of the single veneer sheet relative to the actuating head. The method further includes, while the gripping device is engaged, moving the actuating head relative to the stationary head resulting in an accompanying movement of the portion of the veneer sheet relative to the segment of the veneer sheet, such that the portion of the veneer sheet is located in a different plane than the segment of the veneer sheet.

Alternatively or additionally, further including, while maintaining a position of the single veneer sheet relative to the veneer feeder head, moving the veneer feeder head laterally resulting in a corresponding lateral movement of the single veneer sheet. The method also includes uncoupling the position of the single veneer sheet relative to the veneer feeder head, such that the position of the portion of the veneer sheet is independent from the position of the veneer feeder head.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Provided is a veneer feeder head used to peel a veneer sheet from a stack of veneer (e.g., the veneer sheet at the top of the stack). A stationary head and an actuating head both contact the veneer sheet and the actuating head moves into a peel state, where a portion of the top veneer sheet is raised higher than another portion of the top veneer sheet. This peeling action separates the veneer sheet from the next veneer sheet in the stack of veneer.

Figure 1:
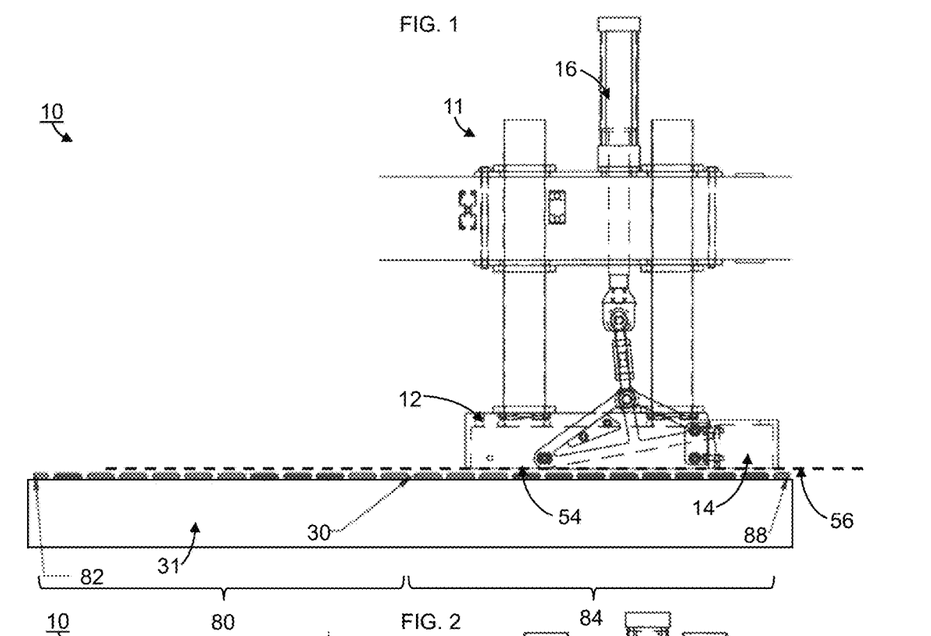
FIG. 1 is a side perspective view of an exemplary veneer feeder head in a pressing state.
Figure 2:
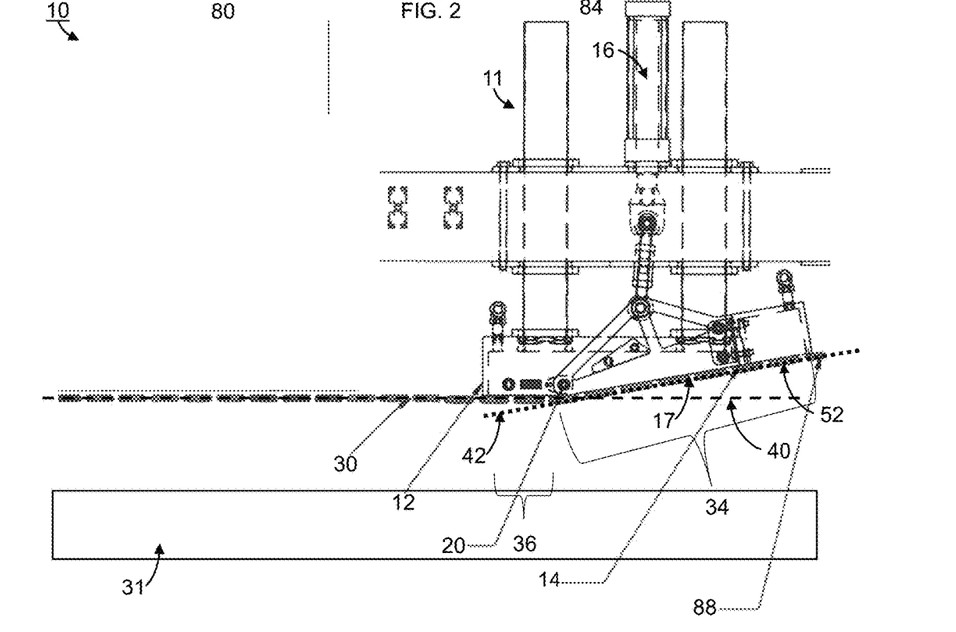
FIG. 2 is a side perspective view of the exemplary veneer feeder head of FIG. 1 in a peeling state.

Turning to FIGS. 1 and 2, a veneer feeding device 10 configured to remove a veneer sheet 30 from a stack of veneer 31 is shown. The veneer feeding device 10 includes a veneer feeder head 11, circuitry 18, and a gross actuator 37. The veneer feeding device 11 includes a stationary head 12, an actuating head 14, and an actuator 16. The actuating head 14 includes a gripping device 17 configured to maintain a position of the veneer sheet 30 relative to the actuating head 14. The actuator 16 causes the actuating head 14 to move relative to the stationary head 12, such that the actuating head moves between a peel state (FIG. 1) and a pressing state (FIG. 2).

While veneer sheets 30 are used to describe the invention, the invention is not limited to use with veneer sheets 30. As will be understood by one of ordinary skill in the art, the veneer feeding device 10 and veneer feeder head 11 may be used with any suitable sheet like infeed object. The veneer sheets 30 may be made of wood, plastic, metal, composites thereof, or of any suitable material. For example, the length of the veneer sheets 30 may vary from about four feet (1.2 meters) up to about ten feet (3 meters). The veneer sheets 30 may be thin (relative to its width and length) with thicknesses in the range of ¼ of an inch (6.35 mm) or less.

The actuating head 14 includes a gripping device 17 having an engaged state and a disengaged state. For example, the gripping device 17 may be located on a contacting surface 52 of the actuating head 14. In the engaged state, the gripping device 17 is configured to maintain a position of a portion 34 of the veneer sheet 30 relative to the actuating head 14, such that movement of the actuating head 14 results in an accompanying movement of the portion 34 of the veneer sheet 30. For example, as shown in FIG. 2, when the gripping device 17 is in the engaged state, pivoting of the actuating head 14 results in a corresponding movement of the portion 34 of the veneer sheet being engaged by the gripping device 17. In the disengaged state, the gripping device 17 and the portion 34 of the veneer sheet 30 are uncoupled, such that the position of the portion 34 of the veneer sheet 30 is independent from the position of the actuating head 14. That is, in the disengaged state, the gripping device 17 has released the veneer sheet 30.

The gripping device 17 may maintain the position of the portion 34 of the veneer sheet 30 using any suitable means. For example, the gripping device 17 may use at least one of negative pressure, friction, an adhesive, or a fastener 21 (e.g., nail(s) and/or tack(s)).

The stationary head 12 of the veneer feeder head 10 is configured to contact a segment 36 of the veneer sheet 30 separate from the portion 34 of the veneer sheet 30. That is, the stationary head 12 is positioned relative to the actuating head 14 such that, when the stationary head 12 and the actuating head 14 contact a veneer sheet 30, the stationary head 12 contacts a segment 36 of the veneer sheet 30 that is separate from the portion 34 of the veneer sheet 30 contacted by the actuating head 14. By contacting separate parts of the veneer sheet 30, movement of the actuating head 14 relative to the stationary head 12 causes movement of the portion 34 of the veneer sheet 30 relative to the segment 36 of the veneer sheet 30.

The stationary head 12 may also include a gripping device (also called a grabbing device 19) having an engaged state and a disengaged state. The grabbing device 19 may be located on a touching surface 54 of the stationary head 12. In the engaged state, the grabbing device 19 is configured to maintain a position of the segment 36 of the veneer sheet 30 relative to the stationary head 12, such that movement of the stationary head 12 results in an accompanying movement of the segment 36 of the veneer sheet 30.

The stationary head 12 and the actuating head 14 may have any suitable structure. For example, the stationary head 12 and actuating head 14 may be made of plastic, rubber, metal, or a combination thereof. The stationary head 12 and actuating head 14 may be supported by the veneer feeding device 10 in a manner that allows movement of the stationary head 12 and actuating head 14 as shown in FIGS. 1-4.

The actuator 16 is configured to cause the actuating head 14 to move relative to the stationary head 12, such that the actuating head 14 moves between a peel state (FIG. 2) and a pressing state (FIG. 1).

With continued reference to FIG. 2, when the gripping device 17 is in the engaged state and the actuating head 14 is in a peel state, the portion 34 of the veneer sheet 30 is located in a different plane than the segment 36 of the veneer sheet 30. This movement of the portion 34 of the veneer sheet 30 relative to the segment 36 of the veneer sheet, acts to break the grip of any force that may result in the veneer sheet 30 be conveyed with another veneer sheet from the stack of veneer 31.

As described in further detail below, the actuating head 14 may be configured to engage a part of the veneer sheet 30 that is located more peripherally than the part of the veneer sheet 30 engaged by the stationary head 12.

Figure 4:
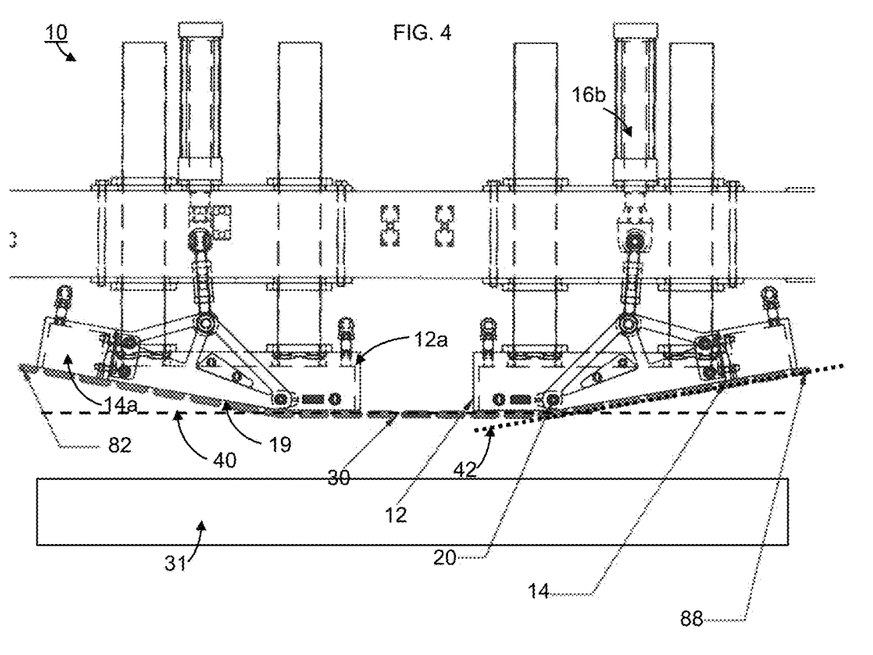
FIG. 4 is a side perspective view of the veneer feeding device of FIG. 3 with the two veneer feeder heads in a peeling state.

As shown in FIGS. 2 and 4, the actuating head 14 may be configured to pivot relative to the stationary head 12 such that, when the actuating head 14 is in a peel state, a plane 42 defined by the portion 34 of the veneer sheet 30 intersects a plane 40 defined by the segment 36 of the veneer sheet 30. As shown, the actuating head 14 may be pivotably attached (e.g., directly or indirectly via another structure) to the stationary head 12 and the actuator 16 may comprise a single actuator that moves the stationary head 12 and the actuating head 14 simultaneously. Alternatively, the actuating head 14 and the stationary head 12 may not be mechanically linked. For example, the actuator 16 may comprise two or more actuators, where the actuator configured to move the stationary head 12 is separate and distinct from the actuator configured to move the actuating head 14.

Alternatively, as shown in FIGS. 7-13, the actuating head 14 may be configured to move relative to the stationary head 12, such that when the actuating head 14 is in a peel state the plane 42 defined by the portion 36 of the veneer sheet 30 is different from and parallel to the plane 40 defined by the segment 34 of the veneer sheet 30. The stationary head 12 and the actuating head 14 may be mechanically linked such that the actuator 16 comprises a single actuator that moves both the stationary head 12 and the actuating head 14. Alternatively, the actuating head 14 and the stationary head 12 may not be mechanically linked. For example, the actuator 16 may comprise two or more actuators, where the actuator configured to move the stationary head 12 is separate and distinct from the actuator configured to move the actuating head 14.

The actuator 16 may also be configured to move the actuating head 14 and the stationary head 12 towards and away from the stack of veneer 31. As an example, the actuator 16 may move the actuating head 14 and the stationary head 12 along a direction of travel 50 perpendicular to the stack of veneer 31. As will be understood by one of ordinary skill in the art, describing the direction of travel as perpendicular to the stack of veneer 31 includes directions of travel approximately perpendicular to the stack of veneer 31 (e.g., +/−10 degrees from perpendicular).

Figure 3:
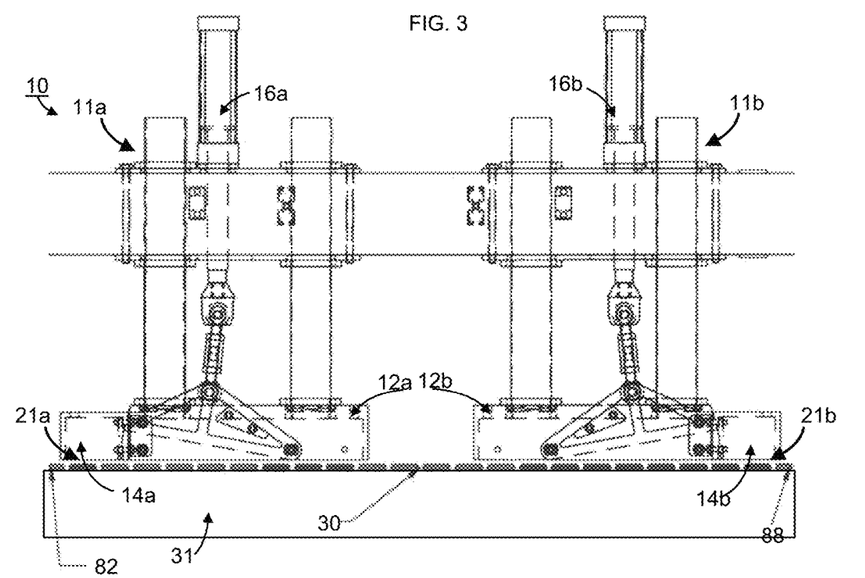
FIG. 3 is a side perspective view of a veneer feeding device including two veneer feeder heads in a pressing state.

When the actuator 16 moves the actuating head 14 and the stationary head 12 towards the veneer sheet 30 causing the contacting surface 52 of the actuating head 14 and the touching surface 54 of the stationary head 12 to press against the veneer sheet 30, the actuating head 14 is in the pressing state (FIGS. 1 and 3). In the pressing state, the contacting surface 52 and the touching surface 54 are located in a same plane 56 defined by the veneer sheet 30.

When the actuator 16 moves the actuating head 14 and the stationary head 12 away from the veneer sheet 30, the actuating head 14 may enter the peel state (FIGS. 2 and 4). That is, a default state of the actuating head 14 may be in the peel state. In the peel state, the contacting surface 52 of the actuating head 14 and the touching surface 54 are located in different planes. The actuating head 14 may be in the default state when the contacting surface 52 of the actuating head 14 is not being pressed against another object (e.g., the stack of veneer 31). As an example, when the actuating head 14 is being moved towards the stack of veneer 31 (but has not yet touched the veneer sheet 30) or the actuating head 14 is being moved away from the stack of veneer 31 (e.g., when holding the veneer sheet 30), the actuating head 14 may enter the peel state.

The default state of the actuating head 14 being the peel state may be caused by the mechanical design of the veneer feeder head 11. For example, the actuating head 14 may be lighter than the stationary head 12 and/or the actuator 16 may be mechanically connected to the stationary head 12 and the actuating head 14 such that the actuating head 14 rests in the peel state.

By having the default state of the actuating head be the peel state, a single actuator may be used to move the stationary head 12 and actuating head 14 towards and away from the stack of veneer 31 and to peel the veneer sheet 30 from the stack of veneer 31. For example, FIGS. 1 and 3 show the stationary head 12 and actuating head 14 being pressed down against the veneer sheet 30 that is located on top of the stack of veneer 31. The actuator 16 in this example is shown as a linear actuator that is in an extended state.

In FIGS. 2 and 4, the actuator 16 is now in a retracted state, causing the actuating head 14 and stationary head 12 to be in a position raised above their previous position in FIGS. 1 and 3 and causing the actuating head 14 to be in the peel state. Because the gripping device 17 and grabbing device 19 are in an engaged state in FIGS. 2 and 4, the actuating head 14 and the stationary head 12 move the veneer sheet 30 away from the stack of veneer 31.

Figure 5:
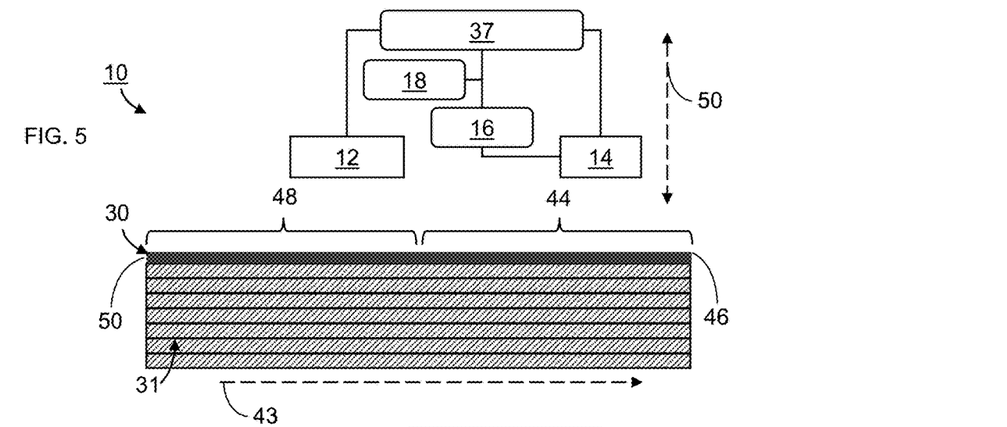
FIG. 5 is a side schematic view of a veneer feeding device including an actuating head and a stationary head in a pressing state.
Figure 6:
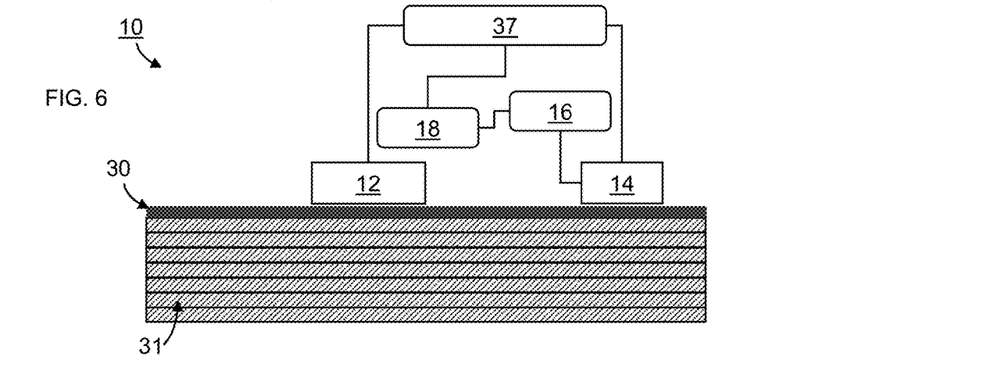
FIG. 6 is a side schematic view of the veneer feeding device of FIG. 5 in a peeling state.
Figure 7:
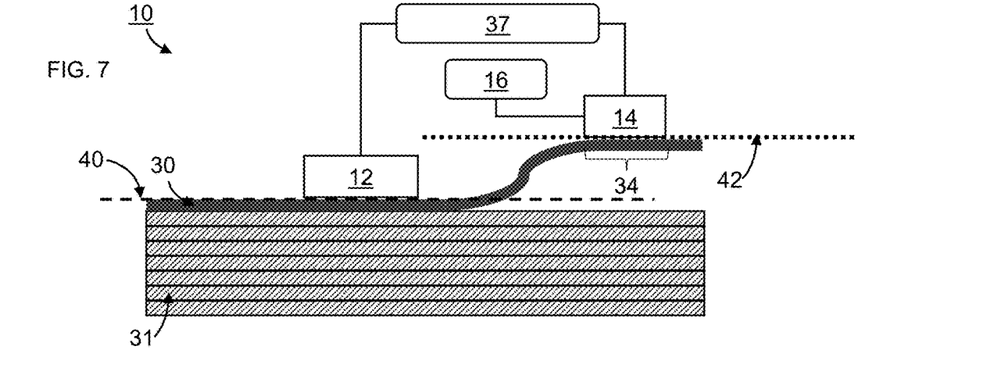
FIG. 7 is a side schematic view of the veneer feeding device of FIG. 6 lifting a sheet of veneer according to an exemplary embodiment.

Turning to FIGS. 5-9, the circuitry 18 of the veneer feeding device 10 is configured to control movement of the actuating head 14 and the stationary head 12 by the actuator 16, such that the actuating head 14 and the stationary head 12 make contact with the veneer sheet 30. Alternatively, the circuitry 18 may control movement of the actuating head 14 and the stationary head 12 by a gross actuator 37. The gross actuator 37 may be separate from the actuator 16. For example, FIG. 5 shows the stationary head 12 and the actuating head 14 positioned above the stack of veneer 31. In FIG. 6, the stationary head 12 and the actuating head 14 have been moved towards the stack of veneer 31, such that the stationary head 12 and the actuating head 14 are touching the veneer sheet 30 located at the top of the stack of veneer 31. The actuating head 14 is in a pressing state in FIG. 6.

The actuator 16 and gross actuator 37 may comprise any suitable device for changing the position of the stationary head 12 and the actuating head 14. For example, one or both of the actuators 16, 37 may comprise a linear actuator, a hydraulic actuator, or an electric motor. The circuitry 18 may be configured to control operation of both of the actuators 16, 37 (when present).

The circuitry 18 is also configured to separate the veneer sheet 30 from the stack of veneer 31 by causing the gripping device 17 to be in the engaged state and control movement of the actuating head 14 by the actuator 16, such that the actuating head 14 moves from the pressing state to the peel state. For example, in FIG. 7 the actuating head 14 has moved from the pressing state (FIG. 6) to the peel state. In this example, the majority of the veneer sheet 30 is still resting on the stack of veneer 31, but the portion 34 of the veneer sheet 30 gripped by the gripping device 17 of the actuating head 14 has been raised off of the stack of veneer 31. This movement of the portion 34 of the veneer sheet 30 away from the stack of veneer 31 separates the veneer sheet 30 from the stack of veneer 31, such that only a single sheet of veneer is moved by the veneer feeder head 11.

As will be understood by one of ordinary skill in the art, movement of the veneer sheet 30 relative to the stack of veneer 31 in the figures may not be to scale.

After separating the veneer sheet 30 from the stack of veneer 31, the circuitry 18 may be further configured to maintain the gripping device 17 in the engaged state and cause the actuator 16 to raise the actuating head 14, the stationary head 12, and the veneer sheet 30. The circuitry 18 may also be configured to cause the grabbing device 19 of the stationary head 12 to be in the engaged state. As described above, the veneer feeding device 10 may include a gross actuator 37 configured to laterally move the veneer feeder head 11 along a direction of travel 43 between a home position 60 and a feeding position 62. For example, FIG. 8 shows the home position 60 with the stationary head 12 and actuating head 14 located above the stack of veneer 31.

The circuitry 18 may be further configured to cause the gross actuator 37 to move the actuating head 14, the stationary head 12, and the veneer sheet 30 along the direction of travel 43 to the feeding position 62. FIG. 9 depicts the feeding position 62 with the veneer sheet 30 held by the veneer feeder head 10 and being fed into a transporter 70. The circuitry 18 may be additionally configured to cause the gripping device 17 and/or the grabbing device 19 to be in a disengaged state. For example, causing the gripping device 17 and the grabbing device 19 (when present) to be in the disengaged state may cause the veneer feeder head 11 to release the veneer sheet 30 so that the transporter 70 may convey the veneer sheet 30 to the dryer. The transporter 70 may include, e.g., a conveyor, belt, rollers, or any other suitable structure for transporting the veneer sheet 30.

As will be understood by one of ordinary skill in the art, the circuitry 18 may have various implementations. For example, the circuitry 18 may include any suitable device, such as a controller, processor, central processing unit, programmable circuit, integrated circuit, memory and I/O circuits, an application specific integrated circuit, microcontroller, complex programmable logic device, other programmable circuits, or the like. The circuitry 18 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The circuitry 18 may be communicatively coupled to computer readable medium through a system bus, mother board, or using any other suitable structure known in the art.

Figures 8, 9:
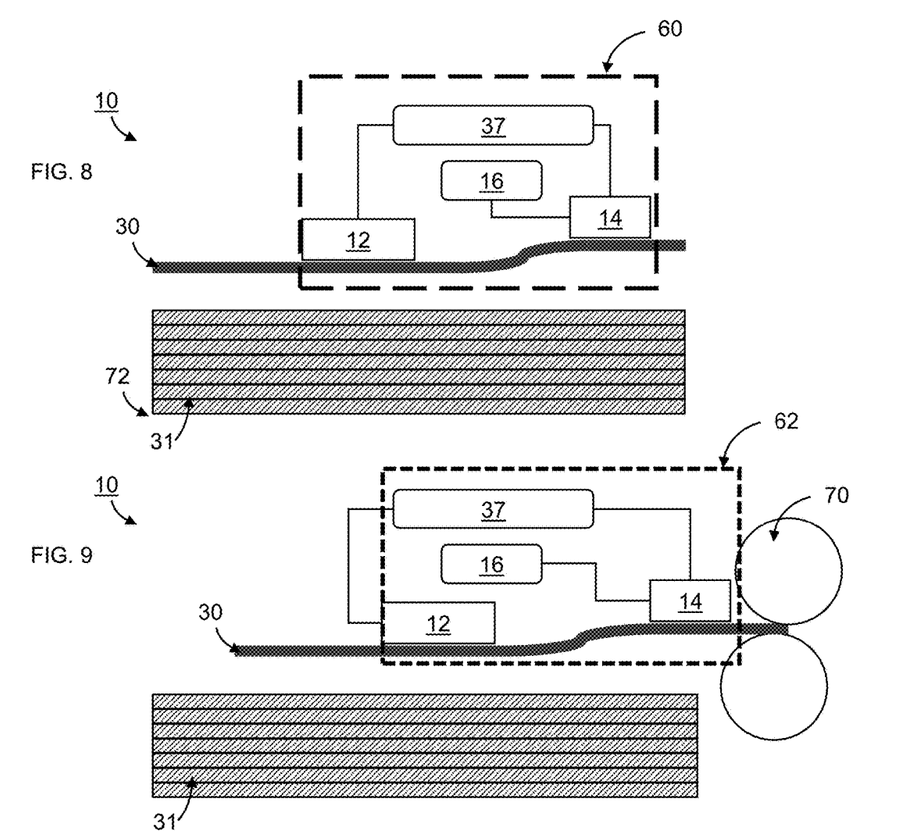
FIG. 8 is a side schematic view of the veneer feeding device of FIG. 7 with the veneer sheet separated from the stack of veneer.
FIG. 9 is a side schematic view of the veneer feeding device of FIG. 8 with the veneer sheet being fed into a transporter according to an exemplary embodiment.
Figure 10:
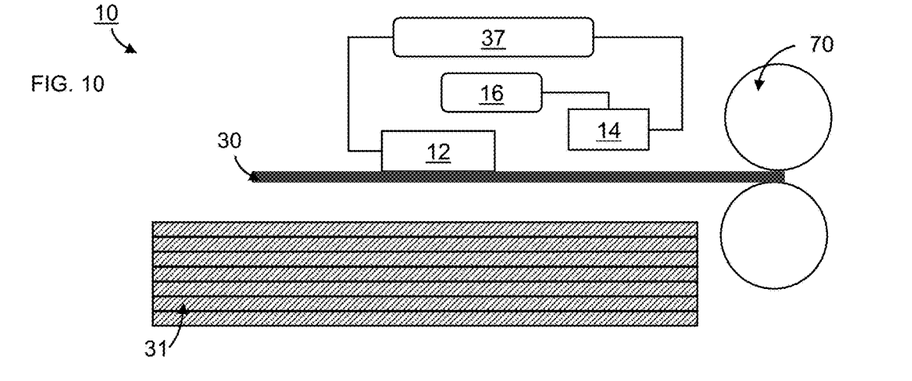
FIG. 10 is a side schematic view of the veneer feeding device of FIG. 8 with the veneer sheet being fed into a transporter according to another exemplary embodiment.

In FIG. 9, the veneer sheet 30 is held by both the stationary head 12 and the actuating head 14. In another embodiment shown in FIG. 10, the veneer sheet 30 is not held by the stationary head 12 when feeding the veneer sheet 30 into the transporter 70. In still another embodiment, the veneer sheet 30 is held by the actuating head 14 and not the stationary head 12 when feeding the veneer sheet 30 into the transporter 70.

The veneer feeding device 10 may additionally include a holding area 72 configured to receive the stack of veneer 31. For example, the holding area 72 may comprise a rack or open area for receiving the stack of veneer 31. As described previously, the veneer sheet 30 is located at a top position of the stack of veneer 31.

Turning to FIG. 5, along the direction of travel 43, the veneer sheet 30 includes a front half 44 including a front edge 46 and a back half 48 including a back edge 50. Turning back to FIG. 1, long a direction transverse to the direction of travel 43 (e.g., perpendicular to the direction of travel 43), the veneer sheet 30 includes a left half 80 including a left edge 82 and a right half 84 including a right edge 88.

In one embodiment, in the home position 60, the veneer feeder head 11 is positioned over the holding area 72 in a location associated with either the front half 44 or the back half 48 of the veneer sheet 30 when the stack of veneer 31 is located in the holding area 72. When the veneer feeder head 11 is positioned over the front half 44, the actuating head 14 is positioned closer to the front edge 46 than the stationary head 12. When the veneer feeding head 11 is positioned over the back half 48, the actuating head 14 is positioned closer to the back edge 50 than the stationary head 12.

In another embodiment, in the home position 60, the veneer feeder head 11 is positioned over the holding area 72 in a location associated with either the left half 80 or the right half 84 of the veneer sheet 30 when the stack of veneer 31 is located in the holding area 72. When the veneer feeding head 11 is positioned over the left half 80, the actuating head 14 is positioned closer to the left edge 82 than the stationary head 12. When the veneer feeding head 11 is positioned over the right half 84, the actuating head 14 is positioned closer to the right edge 88 than the stationary head 12.

Turning to FIGS. 3, 4, 11, and 12, the veneer feeding device 10 includes a veneer feeder head 11a and an another veneer feeder head 11b. As shown in FIGS. 3 and 4, the veneer feeder head 11a may include an actuator 16a and the another veneer feeder head 11b may include a separate actuator 16b. That is, the actuator 16a may be configured to move the actuating head 14a and the stationary head 12a of the veneer feeder head 11a towards and away from the stack of veneer 31. Similarly, the actuator 16b may be configured to move the actuating head 14b and the stationary head 12b of the another veneer feeder head 11b towards and away from the stack of veneer 31.

Figure 11:
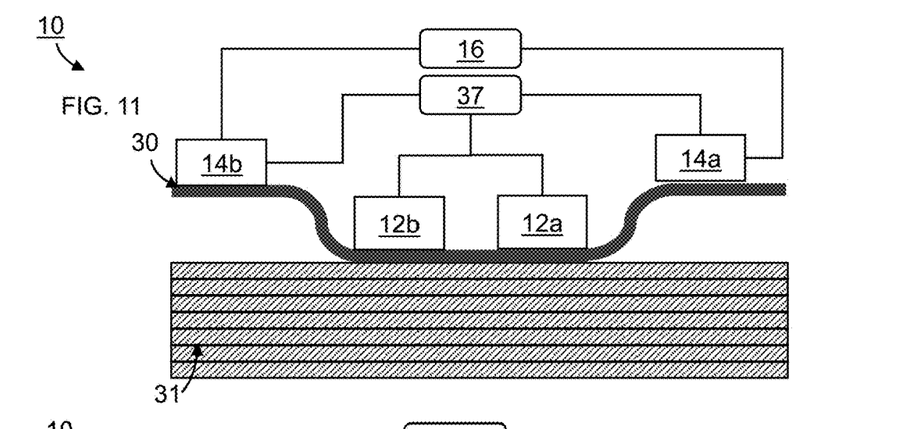
FIG. 11 is a side perspective view of the exemplary veneer feeding devices having two stationary heads and two actuating heads in a peeling state.
Figure 12:
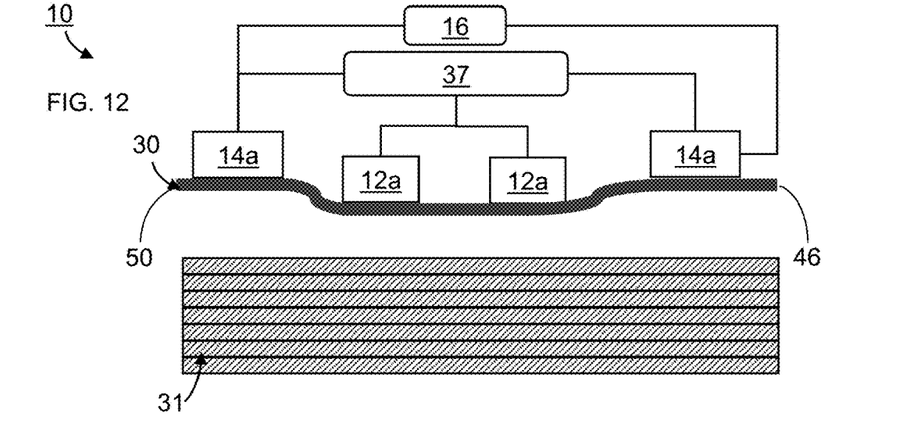
FIG. 12 is a side schematic view of the veneer feeding device of FIG. 11 with the veneer sheet separated from the stack of veneer.

Alternatively, as shown in FIGS. 11 and 12, the veneer feeder head 11a and veneer feeder head 11b may share one actuator 16. That is, the actuator 16 may be configured to move the actuating head 14 and the stationary head 12 of both the veneer feeder head 11a and the another veneer feeder head 11b towards and away from the stack of veneer 31.

With continued reference to FIGS. 3, 4, 11, and 12, the circuitry 18 may be configured to control movement of both the veneer feeder head 11a and the another veneer feeder head 11b by the actuator(s) 16, such that the actuating head 14 and the stationary head 12 of both the veneer feeding head 11a and the veneer feeder head 11b make contact with the veneer sheet 30. The gross actuator 37 may be configured to laterally move at least one of the veneer feeder head 11a or the another veneer feeder head 11b along a direction of travel 43 between a home position 60 and a feeding position 62. Alternatively, the transporter 70 may receive the veneer sheet 30 without lateral movement of the veneer feeder head 11.

The circuitry 18 may be further configured to separate the veneer sheet 30 from the stack of veneer 31 by causing the gripping device 17 of both the veneer feeder head 11a and the another veneer feeder head 11b to be in the engaged state and control movement of the actuating head 14 of the veneer feeder head 11a and the another veneer feeder head 11b, such that the actuating head 14 of the veneer feeder head 11a and the another veneer feeder head 11b move from the pressing state to the peel state.

In one embodiment, in the home position 60, the actuating head 14a of the veneer feeder head 11a may be positioned over the holding area 72 in a location associated with the front half 44 and closer to the front edge 46 of the veneer sheet 30 than the stationary head 12a of the veneer feeder head 11a. Similarly, in the home position 60, the actuating head 14b of the another veneer feeder head 11b is positioned over the holding area 72 in a location associated with the back half 48 and closer to the back edge 50 of the veneer sheet 30 than the stationary head 12b of the another veneer feeder head 11b.

In another embodiment, in the home position 60, the actuating head 14a of the veneer feeder head 11a is positioned over the holding area in a location associated with the left half 80 and closer to the left edge 82 of the veneer sheet 30 than the stationary head 12a of the veneer feeder head 11a. Similarly, in the home position 60, the actuating head 14b of the another veneer feeder head 11b is positioned over the holding area in a location associated with the right half 84 and closer to the right edge 88 of the veneer sheet 30 than the stationary head 12b of the another veneer feeder head 11b.

Figure 13:
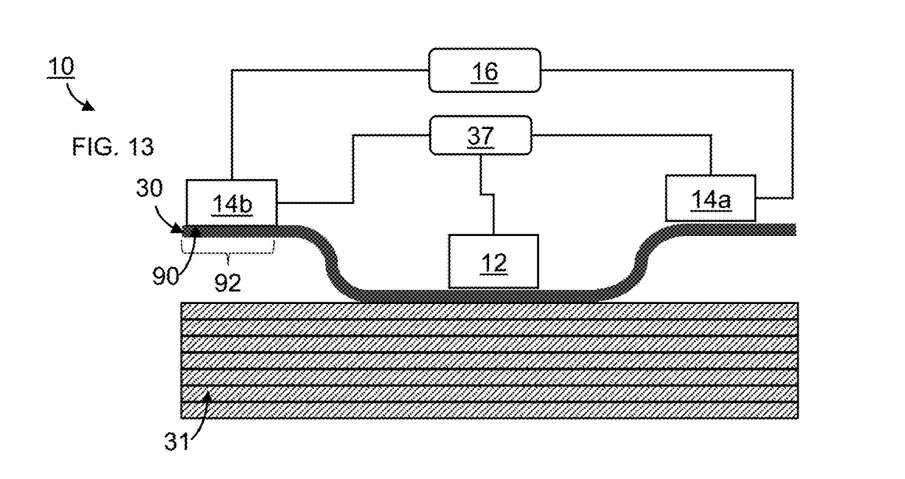
FIG. 13 is a side perspective view of an exemplary veneer feeding devices having one stationary head and two actuating heads in a peeling state.

Turning to FIG. 13, the veneer feeding head 11 may include an another actuating head 14b including a gripping device (also called a holding device 90) having an engaged state and a disengaged state. In the engaged state, the holding device 90 is configured to maintain a position of a section 92 of the veneer sheet 30 relative to the another actuating head 14b, such that movement of the another actuating head 14b results in an accompanying movement of the section 92 of the veneer sheet 30.

The actuator 16 is further configured to cause the another actuating head 14b to move relative to the stationary head 12, such that the another actuating head 14b moves between the peel state and the pressing state. When the holding device 90 is in the engaged state and the another actuating head 14b is in the peel state, the section 92 of the veneer sheet 30 is located in a different plane than the segment 34 of the veneer sheet.

The circuitry 18 may be configured to control movement of the actuating head 14a, the stationary head 12, and the another actuating head 14b by the actuator 16, such that the actuating head 14a, the stationary head 12, and the another actuating head 14b make contact with the veneer sheet 30. The circuitry 18 may also be configured to separate the veneer sheet 30 from the stack of veneer 31 by causing the gripping device 17 and the holding device 92 to be in the engaged state and by controlling movement of the actuating head 14a and the another actuating head 14b by the actuator 16, such that the actuating head 14a and the another actuating head 14b move from the pressing state to the peel state.

With continued reference to FIG. 13, the gross actuator 37 may be configured to laterally move at least one of the stationary head 12, the actuating head 14a, or the another actuating head 14b along a direction of travel 43 between a home position 60 and a feeding position 62.

In one embodiment, in the home position 60, the actuating head 14a may be positioned over the holding area 72 in a location associated with the front half 44 and closer to the front edge 46 of the veneer sheet 30 than the stationary head 12. Similarly, in the home position 60, the another actuating head 14b is positioned over the holding area 72 in a location associated with the back half 48 and closer to the back edge 50 of the veneer sheet 30 than the stationary head 12.

In another embodiment, in the home position 60, the actuating head 14a is positioned over the holding area 72 in a location associated with the left half 80 and closer to the left edge 82 of the veneer sheet 30 than the stationary head 12. Similarly, in the home position 60, the another actuating head 14b is positioned over the holding area 72 in a location associated with the right half 84 and closer to the right edge 88 of the veneer sheet 30 than the stationary head 12.

Figure 14:
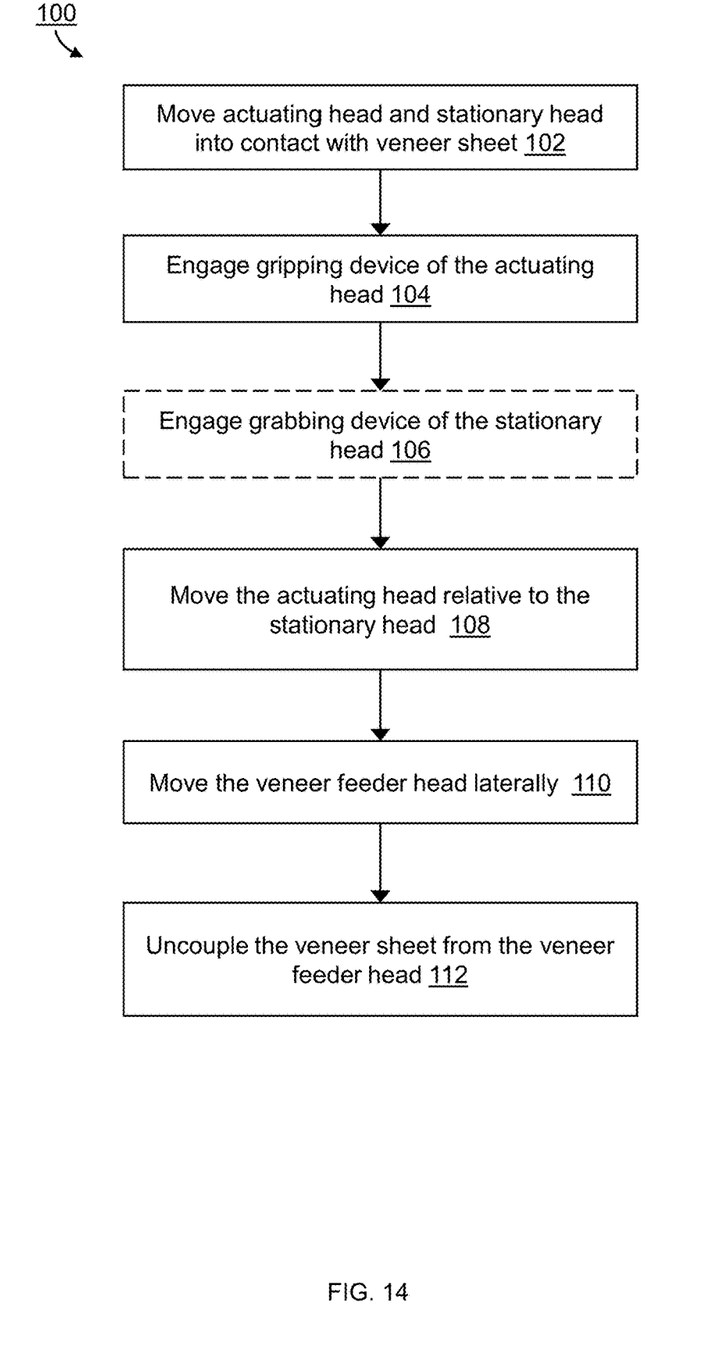
FIG. 14 is a flow diagram showing a method for peeling a top veneer sheet off of a stack of veneer by lifting one portion of the veneer higher than another portion of the top veneer sheet

Turning to FIG. 14, a method 100 for differential pickup of a single veneer sheet 30 from a top of a stack of veneer sheets 31 using a veneer feeding head 10 including an actuating head 14 and a stationary head 12 is described.

In process block 102, the actuating head 14 and the stationary head 12 are moved into contact with the single veneer sheet 30, such that the actuating head 14 contacts a portion 34 of the veneer sheet 30 and the stationary head 12 contacts a segment 36 of the veneer sheet 30 separate from the portion 34 of the veneer sheet 30.

In process block 104, the gripping device 17 of the actuating head 14 is engaged, such that the gripping device 17 maintains a position of the portion 34 of the single veneer sheet 30 relative to the actuating head 14. In optional process block 106, the grabbing device 19 of the actuating head 14 is engaged, such that the grabbing device 19 maintains a position of the segment 36 of the single veneer sheet 30 relative to the stationary head 12.

In process block 108, while the gripping device 17 is engaged, the actuating head 14 moves relative to the stationary head 12 resulting in an accompanying movement of the portion 34 of the veneer sheet 30 relative to the segment 36 of the veneer sheet 30, such that the portion 34 of the veneer sheet 30 is located in a different plane than the segment 36 of the veneer sheet 30.

In process block 110, while maintaining a position of the single veneer sheet 30 relative to the veneer feeder head 11, the veneer feeder head 11 moves laterally resulting in a corresponding lateral movement of the single veneer sheet 30. The position of the single veneer sheet 30 relative to the veneer feeder head 11 may be accomplished by maintaining the gripping device 17 and/or the grabbing device 19 in an engaged state.

In process block 112, the position of the single veneer sheet 30 relative to the veneer feeder head 11 is uncoupled, such that the position of the portion 34 of the veneer sheet 30 is independent from the position of the veneer feeder head 11. As an example, the veneer sheet 30 may be uncoupled from the veneer feeder head 11 by disengaging the gripping device 17 and the grabbing device 19 (e.g., simultaneously).

The veneer feeding device 10 may move the veneer sheet 30 using a combination of actuating head(s) and stationary head(s). For example, the veneer feeding device 10 may use the gripping device (also called grabbing device or holding device) of each stationary head 12 and actuating head 14 to move the veneer sheet 30. Upon feeding the veneer sheet 30 to the transporter 70, the veneer feeding device 10 may release each of the gripping devices (e.g., simultaneously). Alternatively, the veneer feeding device 10 may use any combination of stationary head(s) 12 and actuating head(s) 14 to move the veneer sheet 30. While lateral movement of the veneer feeder head 11 to feed the veneer sheet 30 to the transporter 70, any suitable movement to feed the veneer sheet 30 to the transporter 70 is possible.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A veneer feeder system configured to peel a veneer sheet from a stack of veneer, the veneer feeder system comprising:
  a first veneer feeder head and a second veneer feeder head, wherein each of the first and second veneer feeder head comprises:
    an actuating head including a gripping device having an engaged state and a disengaged state, wherein in the engaged state the gripping device is configured to maintain a position of a portion of the veneer sheet relative to the actuating head, such that movement of the actuating head results in an accompanying movement of the portion of the veneer sheet;
    a stationary head configured to contact a segment of the veneer sheet separate from the portion of the veneer sheet; and
    an actuator configured to;
      cause the actuating head to move relative to the stationary head, such that the actuating head moves between a peel state and a pressing state; and
      move the actuating head and the stationary head towards and away from the stack of veneer;
    wherein, when the gripping device is in the engaged state and the actuating head is in a peel state, the portion of the veneer sheet is located in a different plane than the segment of the veneer sheet; and
  circuitry configured to:
    control movement of the first veneer feeder head and the second veneer feeder head by the actuator of the first veneer feeder head and the actuator of the second veneer feeder head, such that:
      the actuating head the stationary head of the first veneer feeding head make contact with the veneer sheet; and
      the actuating head and the stationary head of the second veneer feeder head make contact with the veneer sheet; and
    separate the veneer sheet from the stack of the veneer by;

causing the gripping device of both the first veneer feeder head and the second veneer feeder head to be in the engaged state;

controlling movement of the actuating head of the first veneer feeder head by the actuator of the first veneer feeder head, such that the actuating head of the first veneer feeder head moves from the pressing state to the peel state; and controlling movement of the actuating head of the second veneer feeder head by the actuator of the second veneer feeder head, such that the actuating head pf the second veneer feeder head moves from the pressing state to the peel state.

2. The veneer feeder system of claim 1, wherein the actuating head of both the first veneer feeder head and the second veneer feeder head are configured to pivot relative to the corresponding stationary head, such that when the actuating head is in a peel state a first plane defined by the portion of the veneer sheet intersects a second plane defined by the segment of the veneer sheet.

3. The veneer feeder system of claim 1, wherein the actuating head of both the first veneer feeder head and the second veneer feeder head are configured to move relative to the corresponding stationary head, such that when the actuating head is in a peel state a first plane defined by the portion of the veneer sheet is different from and parallel to a second plane defined by the segment of the veneer sheet.

4. The veneer feeder system claim 1, wherein for both the first veneer feeder head and the second veneer feeder head:
the actuator is further configured to move the actuating head and the stationary head towards and away from the sheet of veneer;
the gripping device is located on a contacting surface of the actuating head;
the stationary head includes a touching surface;
when the actuator moves the actuating head and the stationary head towards the veneer sheet causing the contacting surface and the touching surface to press against the veneer sheet, the actuating head is in the pressing state;
in the pressing state, the contacting surface and the touching surface are located in a same plane defined by the veneer sheet;
when the actuator moves the actuating head and the stationary head away from the veneer sheet, the actuating head enters the peel state; and
in the peel state, the contacting surface and the touching surface are located in different planes.

5. The veneer feeder system of claim 1, wherein for both the first veneer feeder head and the second veneer feeder head:
the stationary head includes a grabbing device having an engaged state and a disengaged state, wherein in the engaged state the grabbing device is configured to maintain a position of the segment of the veneer sheet relative to the stationary head, such that movement of the stationary head results in an accompanying movement of the segment of the veneer sheet.

6. The veneer feeder system of claim 1, wherein for both the first veneer feeder head and the second veneer feeder head:
the gripping device maintains the position of the portion of the veneer sheet using at least one of negative pressure or a fastener.

7. The veneer feeder system of claim 6, wherein the fastener comprises at least one nail.

8. The veneer feeder system of claim 1, wherein for both the first veneer feeder head and the second veneer feeder head:
in the disengaged state, the gripping device and the portion of the veneer sheet are uncoupled, such that the position of the portion of the veneer sheet is independent from the position of the actuating head.

9. The veneer feeding system of claim 1, further comprising:
a gross actuator configured to laterally move the first and second veneer feeder heads along a direction of travel between a home position and a feeding position;
after separating the veneer sheet from the stack of veneer, the circuitry is further configured to:
maintain the gripping device of both the first and second veneer feeder heads in the engaged state and cause the actuator of both the first and second veneer feeder heads to raise the actuating head of the corresponding veneer feeder head, the stationary head of the corresponding veneer feeder head, and the veneer sheet; and
cause the gross actuator to move the actuating head of both the first and second veneer feeder heads, the stationary head of both second veneer feeder heads, and the veneer sheet along the direction of travel to the feeding position; and
cause the gripping device of both the first and second veneer feeder heads to be in a disengaged state.

10. The veneer feeding system of claim 9, further comprising a holding area configured to receive the stack of veneer, wherein:
the veneer sheet is located at a top position of the stack of veneer;
along the direction of travel, the veneer sheet includes a front half including a front edge and a back half including a back edge;
the first veneer feeder head is positioned over the holding area in a location associated with the front half of the veneer sheet when the stack of veneer is located in the holding area;
the second veneer feeder head is positioned over the holding area in a location associated with the back half of the veneer sheet when the stack of veneer is located in the holding area;
the actuating head of the first veneer feeder head is positioned closer to the front edge than the stationary head of the first veneer feeder head;
the actuating head of the second veneer feeder head is positioned closer to the back edge than the stationary head the second veneer feeder head.

11. The veneer feeding system of claim 9, further comprising a holding area configured to receive the stack of veneer, wherein:
the veneer sheet is located at a top position of the stack of veneer;
transverse to the direction of travel, the veneer sheet includes a left half including a left edge and a right half including a right edge;
the first veneer feeder head is positioned over the holding area in a location associated with the left half of the veneer sheet when the stack of veneer is located in the holding area;
the second veneer feeder head is positioned over the holding area in a location associated with the right half of the veneer sheet when the stack of veneer is located in the holding area;

the actuating head of the first veneer feeder head is positioned close to the left edge than the stationary head of the first veneer feeder head;
the actuating head of the second veneer feeder is positioned closer to the right edge than the stationary head of the second veneer feeder head.

* * * * *